United States Patent
Hintermeister

(10) Patent No.: US 10,929,051 B2
(45) Date of Patent: Feb. 23, 2021

(54) DATA STORAGE ACROSS A PLURALITY OF CLOUD STORAGE SYSTEMS

(71) Applicant: International Business Machines Corporation, Armonk, NY (US)

(72) Inventor: Gregory R. Hintermeister, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/428,218

(22) Filed: May 31, 2019

(65) Prior Publication Data

US 2020/0379644 A1    Dec. 3, 2020

(51) Int. Cl.
*G06F 3/06* (2006.01)
*H04L 29/08* (2006.01)

(52) U.S. Cl.
CPC .............. *G06F 3/065* (2013.01); *G06F 3/067* (2013.01); *G06F 3/0611* (2013.01); *H04L 67/1097* (2013.01)

(58) Field of Classification Search
CPC ........ G06F 3/065; G06F 3/0611; G06F 3/067; H04L 67/1097
See application file for complete search history.

(56) References Cited

U.S. PATENT DOCUMENTS

| | | | |
|---|---|---|---|
| 9,483,657 B2 | 11/2016 | Paul et al. | |
| 10,044,808 B2 | 8/2018 | Yendluri | |
| 10,193,864 B2 | 1/2019 | Toy | |
| 2005/0066121 A1* | 3/2005 | Keeler | G06F 12/128 711/113 |
| 2016/0021185 A1* | 1/2016 | de Sene | H04L 67/1097 709/213 |
| 2017/0046230 A1 | 2/2017 | Guzik | |

\* cited by examiner

*Primary Examiner* — Larry T Mackall
(74) *Attorney, Agent, or Firm* — James Nock; Andrew D. Wright; Roberts Calderon Safran & Cole, P.C.

(57) ABSTRACT

A method includes obtaining, by a computing entity of a multi-cloud dispersed storage network (DSN) system, a multi-cloud storage request to write a data object to the multi-cloud DSN system from a requester. The method further includes sending, by the computing entity, the multi-cloud storage request to a data director module. The method further includes determining a multi-cloud storage scheme to execute the multi-cloud storage request, executing the multi-cloud storage scheme to store the data object in a set of two or more cloud storage systems, generating an index regarding the storage of the data object, and notifying the requester of an estimated response time of the set of two or more cloud storage systems. The method further includes monitoring the performance information of the set of two or more cloud storage systems and data object usage information of the data object to determine a multi-cloud storage performance level.

16 Claims, 9 Drawing Sheets multi-cloud distributed, or dispersed, storage network (DSN) system 5 distributed, or dispersed, storage network (DSN) 10

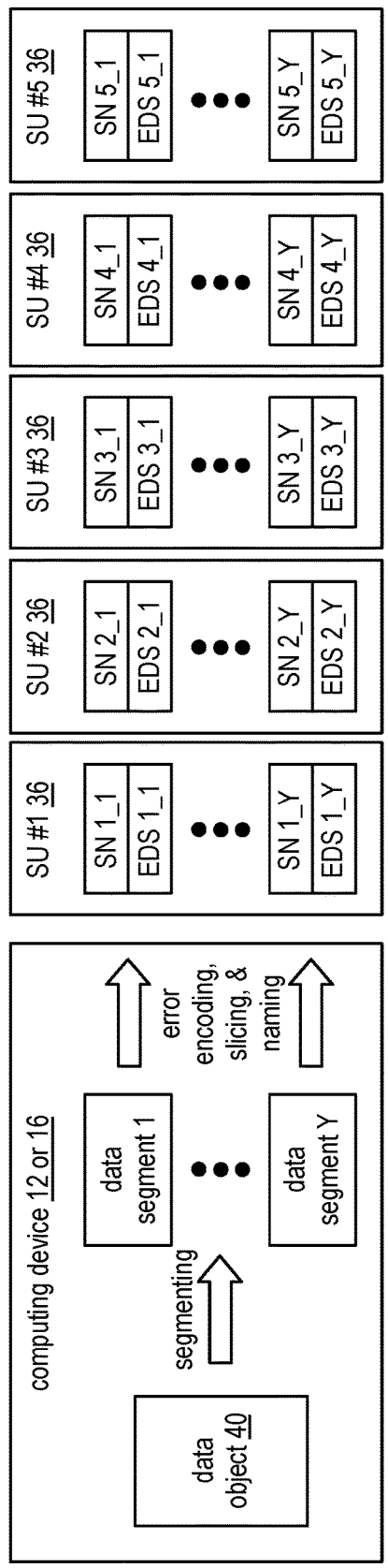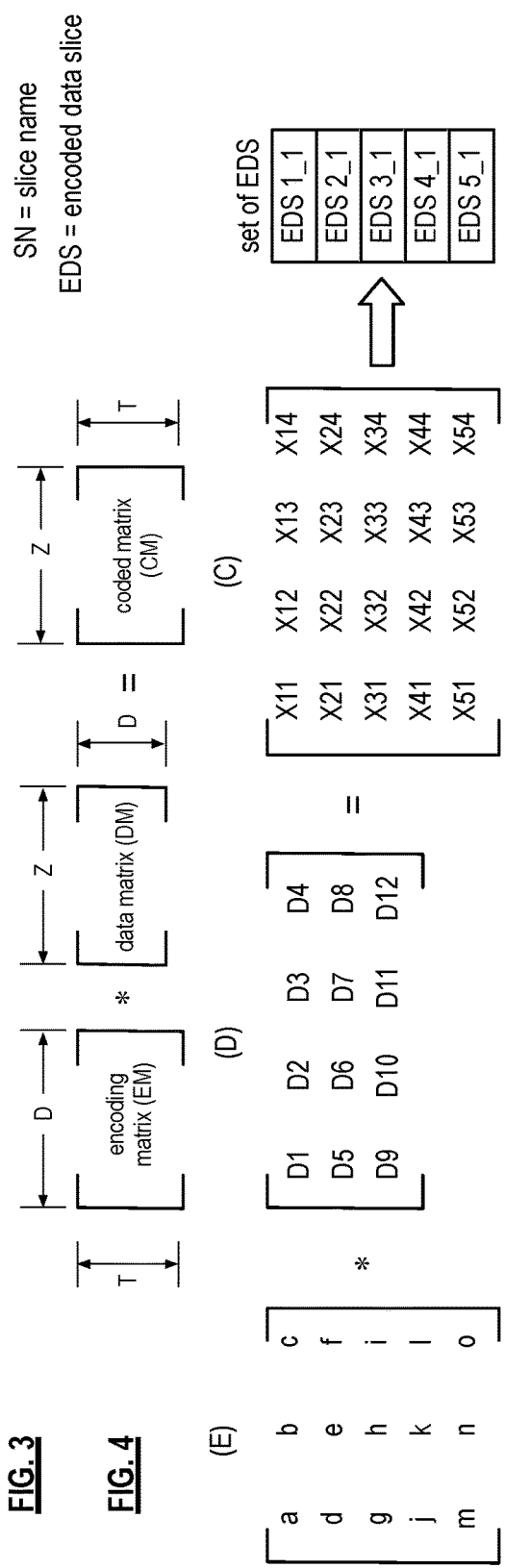

DATA STORAGE ACROSS A PLURALITY OF CLOUD STORAGE SYSTEMS

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1A:
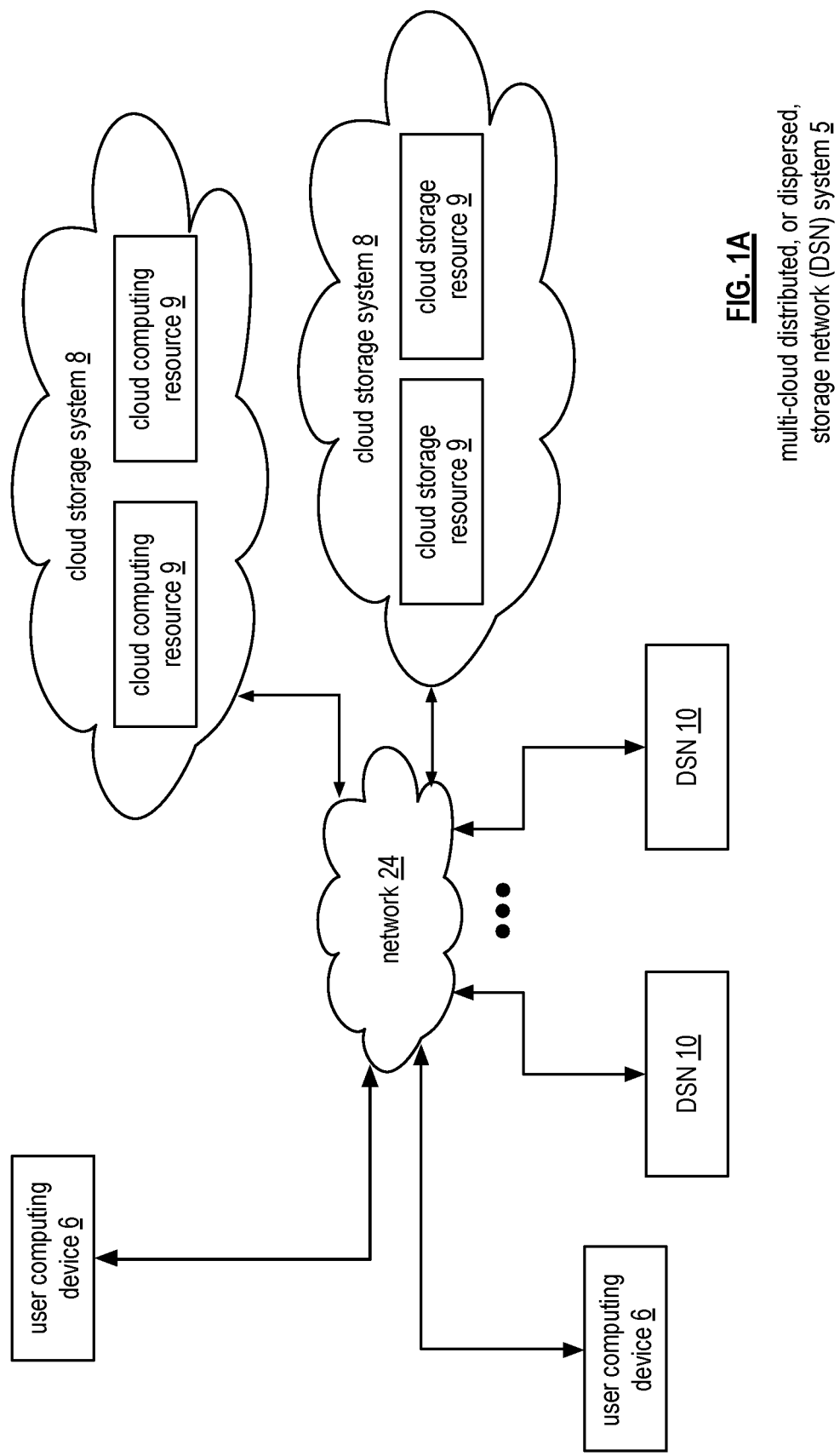
FIG. 1A is a schematic block diagram of an embodiment of a multi-cloud dispersed or distributed storage network (DSN) system in accordance with the present invention.

FIG. 1A is a schematic block diagram of an embodiment of a multi-cloud dispersed, or distributed, storage network (DSN) system 5 that includes a plurality of user computing devices 6, a plurality of DSNs 10, and a plurality of cloud storage systems 8. The components of the multi-cloud DSN system 5 are coupled to a network 24, which may include one or more wireless and/or wire lined communication systems; one or more non-public intranet systems and/or public internet systems; and/or one or more local area networks (LAN) and/or wide area networks (WAN).

The plurality of user computing devices 6 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

The DSN 10 is a cloud storage system that will be discussed in greater detail with reference to FIGS. 1B-8. The plurality of cloud storage systems 8 are other cloud storage systems (e.g., public, private, etc.) that include a plurality of cloud computing resources 9. The plurality of cloud computing resources 9 include one or more computing devices, one or more managing units, one or more integrity processing units, a plurality of geographically dispersed storage devices (e.g., data servers), and any other device(s) including a computing core. The cloud computing resources 9 will be discussed further with reference to FIGS. 1B-9.

The plurality of cloud storage systems 8 may vary in cost, latency, data size restrictions, security, and response time. For example, a cloud storage system with data storage in many different geographical regions may charge different storage fees at different locations. Further, cloud storage systems with data storage in geographical regions located further from a user computing device may result in longer response times for that user device.

In operation, a user computing device 6 connects to one or more of: the plurality of DSNs 10 and the plurality of cloud storage systems 8 via network 24 for storage of one or more data objects. The one or more data objects are replicated and/or otherwise securely stored across one or more of the: the plurality of DSNs 10 and the plurality of cloud storage systems 8.

Figure 1B:
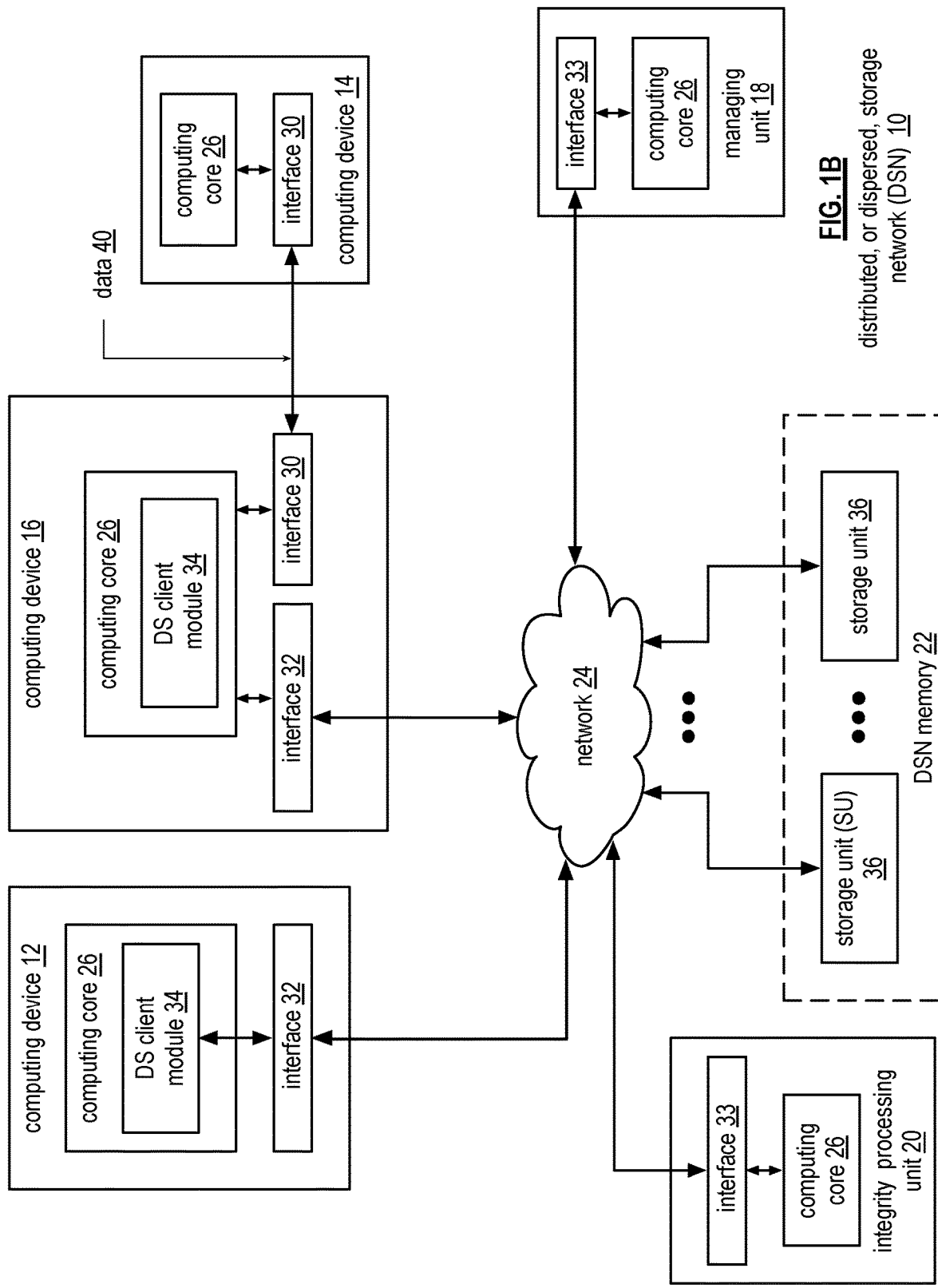
FIG. 1B is a schematic block diagram of an embodiment of a dispersed or distributed storage network (DSN) in accordance with the present invention.

FIG. 1B is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
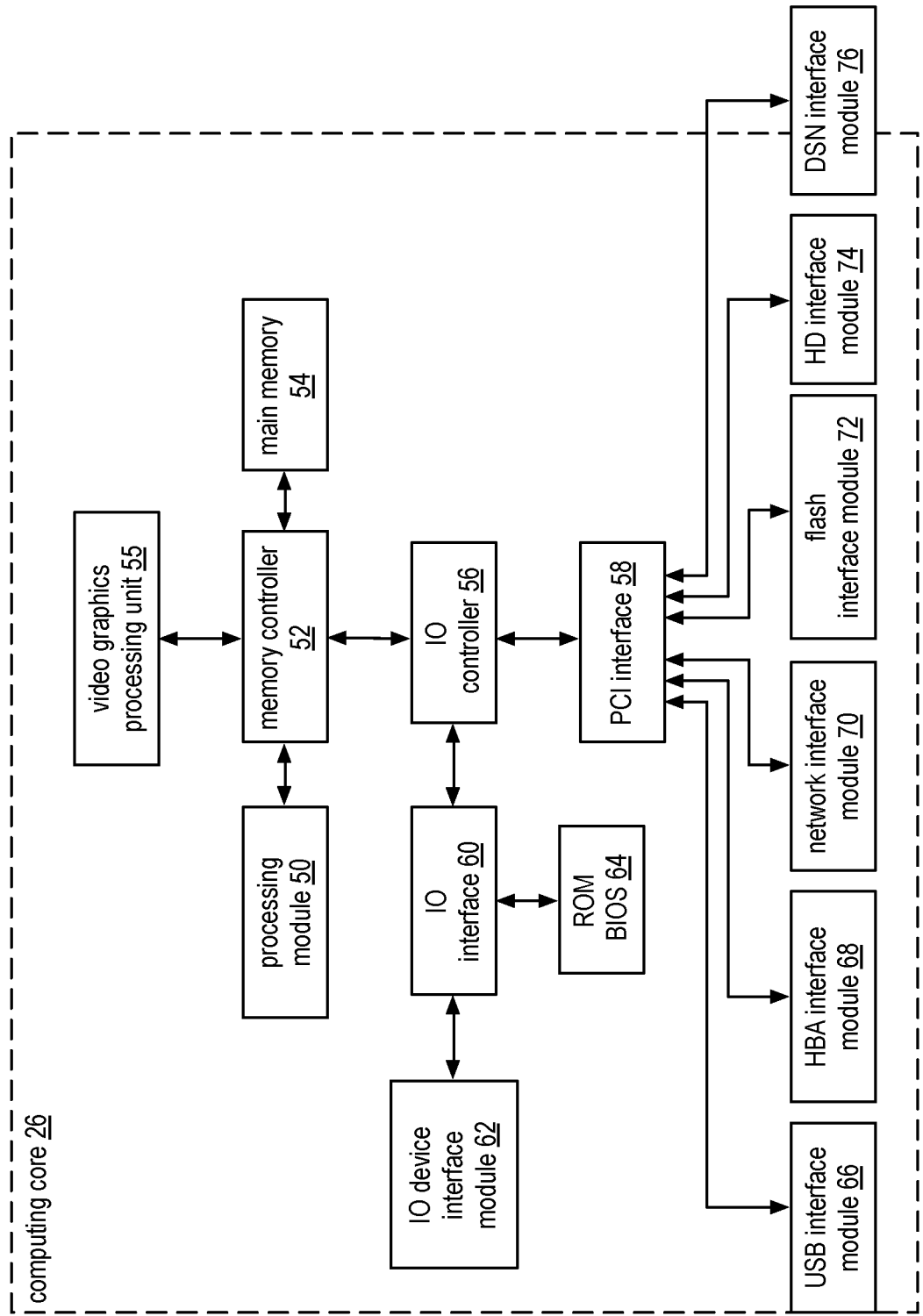
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. The user computing devices 6 of FIG. 1A may be a computing device 12 or 16. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
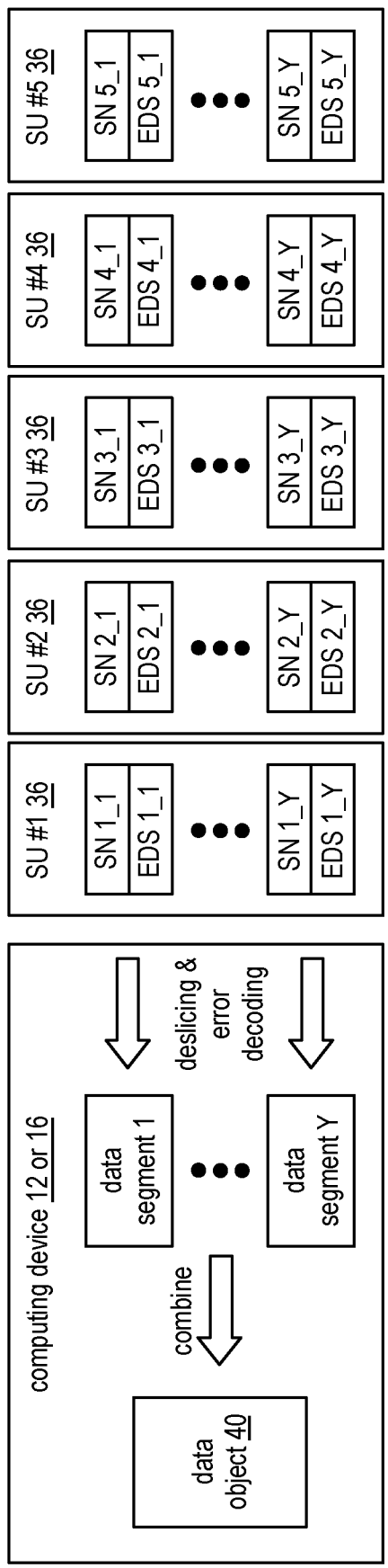
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
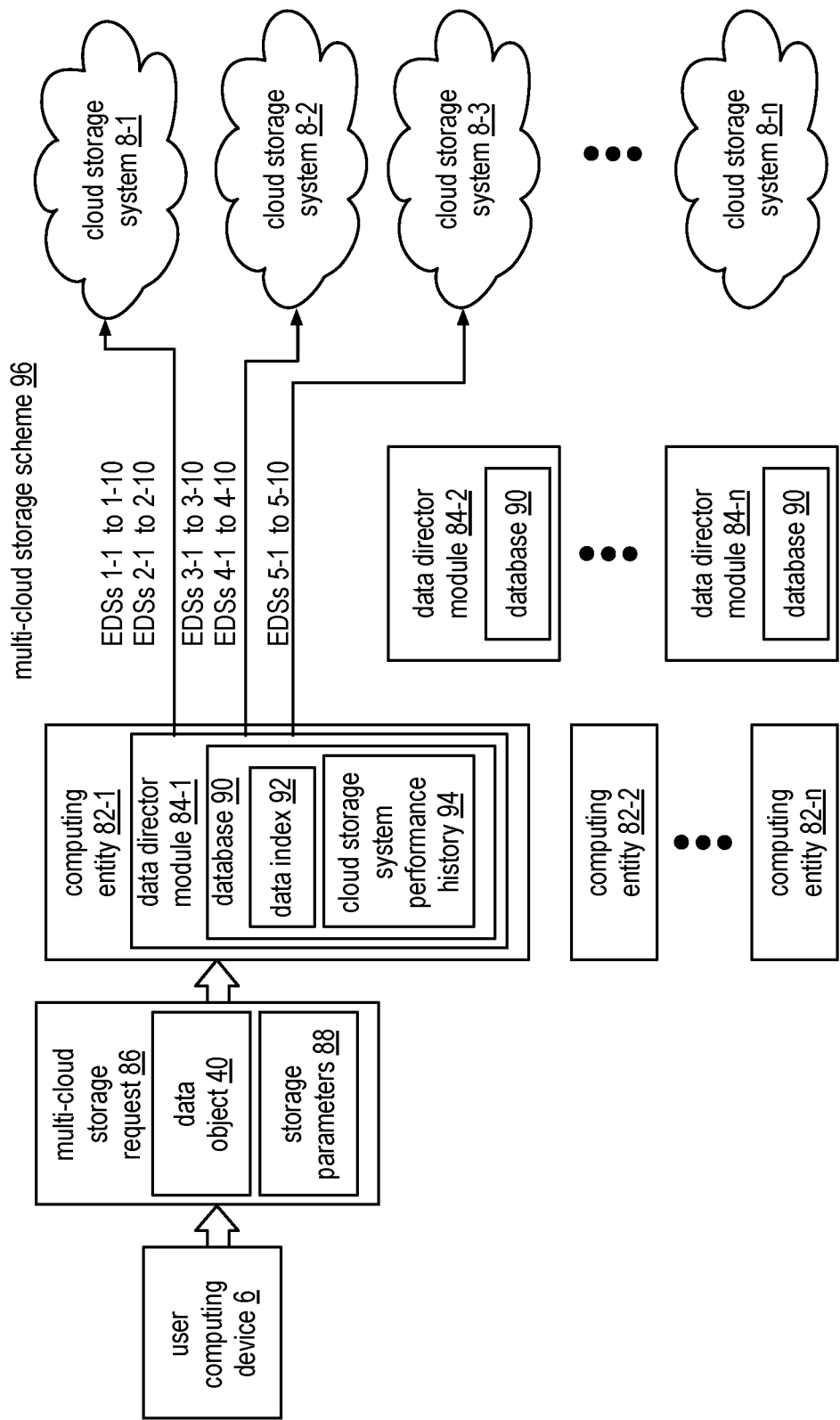
FIG. 9 is a schematic block diagram of another embodiment of the multi-cloud dispersed, or distributed, storage network (DSN) system in accordance with the present invention.

FIG. 9 is a schematic block diagram of another embodiment of the multi-cloud dispersed, or distributed, storage network (DSN) system 5 that includes user computing device 6, a plurality of computing entities 82-1 through 82-n, a plurality of data director modules 84-1 through 84-n, and a plurality of cloud storage systems 8-1 through 8-n.

The plurality of computing entities 82-1 through 82-n may be located in various geographical regions and serve as multi-cloud application programming interface (API) and data domain name systems (DNS). Typically, APIs to process data access requests are specific to a particular cloud storage system. Here, the computing entities 82-1 though 82-n use a single multi-cloud API to interface with the plurality of cloud storage systems 8-1 through 8-n.

The plurality of data director modules 84-1 through 84-n each include a database 90 and may be located in various geographical regions. One or more data director modules of the plurality of data director modules 84-1 through 84-n may be co-located in one or more of the computing entities 82-1 through 82-n, co-located in one or more of the cloud storage systems 8-1 through 8-n, or a stand-alone device. The plurality of data director modules 84-1 through 84-n include a dispersed storage (DS) client module 34, which enables data director modules 84-1 through 84-n to dispersed storage error encode and decode data as previously described with reference to one or more of FIGS. 3-8.

The data director modules 84-1 through 84-n act as conduits and orchestrators to store data across two or more cloud storage systems of the multi-cloud DSN system 5. Storing data across multiple cloud storage systems prevents single points of connectivity failure and allows for a dynamically adjustable storage system that balances storage parameters, data usage, and the performance capabilities of the plurality of cloud storage systems.

Database 90 is a hot-replicated database shared by the plurality of data director modules 84-1 through 84-n. Data index 92 of database 90 includes information on how to locate data currently stored by the data director modules 84-1 through 84-n. Database 90 further includes cloud storage system performance history 94. For each data access request, data director modules 84-1 through 84-n adds performance information pertaining to that data access request to the cloud storage system performance history 94. Performance information includes one or more of latency, response time, network connectivity information, and cost (e.g., cost to upload, download, move data, etc.). For example, if a cloud storage system was unavailable for a data access request, that network connectivity information (e.g., the date, time, length of unavailability, etc.) is added to the cloud storage system performance history 94.

In an example of operation, computing entity 82-1 obtains a multi-cloud storage request 86 from user computing device 6. Multi-cloud storage request 86 includes data object 40 and a plurality of storage parameters 88. For example, the user computing device 6 is a smart phone implementing an application to send the multi-cloud storage request 86 "set( ).mydata.com" where mydata.com is a unique domain host name and the first portion contains data object 40 and storage parameters 88 used for the computing entity 82-1 to call multiple cloud storage system APIs.

Storage parameters 88 include one or more of the location of the multi-cloud storage request 86, a desired storage location (e.g., a particular geographic region), a storage reliability level (e.g., dispersed storage error encoding function parameters), a desired storage cost, a security level, an encoded data slice storage indication (e.g., a request to store the data object as a plurality of sets of encoded data slices), and a multiple data object storage indication (e.g., a request to store the data object as multiple copies).

The computing entity 82-1 directs the multi-cloud storage request 86 to the data director module 84-1. Here, data director module 84-1 is co-located in computing entity 82-1. The computing entity 82-1 selects the data director module 84-1 based on one or more storage parameters 88 of the multi-cloud storage request 86. As an example, the storage parameters 88 indicate that the location of the multi-cloud storage request 86 is close to the location of the computing entity 82-1 and the co-located data director module 84-1. Therefore, the data director module 84-1 is selected to handle the multi-cloud storage request 86. When appropriate, the computing entity 82-1 directs the multi-cloud storage request 86 to a different data director module of the multi-cloud DSN system 5 (e.g., a desired storage location indicated in the storage parameters 88 is close to a particular data director module).

The data director module 84-1 determines a multi-cloud storage scheme 96 to execute the multi-cloud storage request 86. The multi-cloud storage scheme 96 is based on one or more of: the storage parameters 88 of the multi-cloud storage request 86, performance information of available cloud storage systems of cloud storage systems 8-1 through 8-n, storage options of the available cloud storage systems, and proximity of the available cloud storage systems.

Storage options of the available cloud storage systems include data size requirements (e.g., cloud storage systems may have a data size limit and/or different price points for different data sizes), primary data object storage, file sharing, backup storage, archival storage, block storage, file storage, data warehouse, data lake, hybrid storage, disk storage, solid state drive (SSD) storage, and storage security features. Archive and backup storage (e.g., cold storage) generally costs less than primary block or object storage (e.g., hot storage). Some cloud storage systems offer the option of disk-based or flash (solid state drives (SSDs)) storage where flash would be a more expensive option. Other storage options of the available cloud storage systems include storage security features. For example, storage security features include encryption techniques, ability to lock data, authentication techniques, etc. Depending on the nature of the data to be stored, enhanced storage security features may be desirable.

The data director module 84-1 obtains the performance information (e.g., the one or more of latency, response time, network connectivity information, and cost) of the available cloud storage systems in many ways. For example, the data director module 84-1 requests cost information from the available cloud storage systems at certain time intervals (e.g., the data director module 84-1 queries the available cloud storage systems for cost information daily, twice daily, bi weekly, etc.). As another example, the data director module 84-1 stores a small test data object in the cloud storage systems that it wishes to monitor. The test data object is a small data file stored in a stale information area of a cloud storage system (e.g., an area where active work is not occurring). The data director module 84-1 sends various data access requests for the test data object and analyzes the data access responses to determine performance information.

Data director module 84-1 further obtains the performance information by obtaining cloud storage system performance history 94 information from the database 90 (where performance information is added to the cloud storage system performance history 94 after every data access request). The data director module 84-1 may also obtain the performance information by analyzing metadata associated with stored data objects of data object buckets (e.g., a portion of a logical storage vault associated with a particular user).

In this example, the data director module 84-1 determines a multi-cloud storage scheme 96 where the data object 40 is stored as a plurality of sets of encoded data slices (EDSs) across cloud storage systems 8-1 through 8-3. The data director module 84-1 executes the multi-cloud storage scheme 96 to store the data object in cloud storage systems 8-1 through 8-3. Here, EDSs 1-1 to 1-10 and EDSs 2-1 to 2-10 are stored in cloud storage system 8-1, EDSs 3-1 to 3-10 and EDSs 4-1 to 4-10 are stored in cloud storage system 8-2, and EDSs 5-1 to 5-10 are stored in cloud storage system 8-3.

As an example, the data director module 84-1 may have selected cloud storage systems 8-1 through 8-3 because they are available, they are the closest cloud storage systems to the user computing device 6, and/or they have fast response times. The storage parameters 88 may have indicated the dispersed storage error encoding function parameters (e.g., data object is divided into 10 segments, the pillar width is 5, and the decode threshold is 3) and/or the data director module 84-1 may have determined dispersed storage error encoding function parameters based on one or more of a desired reliability level, a desired security level, and a slice storage indication included in the storage parameters 88 and/or the security and reliability storage options of the cloud storage systems.

The data director module 84-1 stores EDSs 1-1 to 1-10 in one or more storage devices of cloud storage system 8-1 and EDSs 2-1 to 2-10 in one or more different storage devices of cloud storage system 8-1 to minimize risk of data loss. For further reliability, the data director module 84-1 may store EDSs 1-1 to 1-10 in one geographical region of cloud storage system 8-1 and EDSs 2-1 to 2-10 in a different geographical region of cloud storage system 8-1. Similar procedures may be done within cloud storage system 8-2.

The multi-cloud storage scheme 96 may also indicate that additional backup data is required. For example, cloud storage system 8-1 stores a copy of EDSs 1-1 to 1-10 and EDSs 2-1 to 2-10 in one or more other storage devices and/or regions of cloud storage system 8-1.

Figure 10:
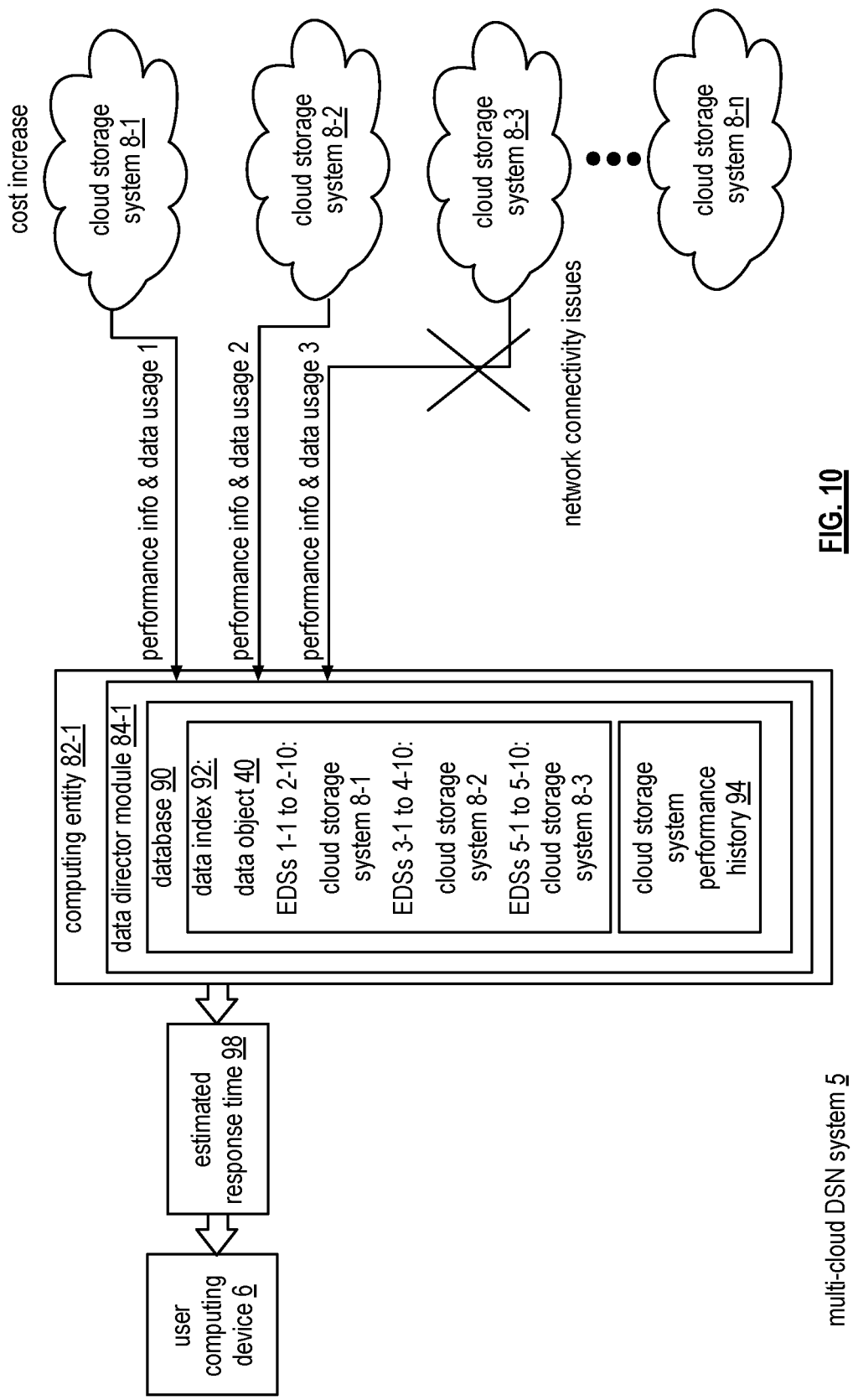
FIG. 10 is a schematic block diagram of another embodiment of the multi-cloud dispersed, or distributed, storage network (DSN) system in accordance with the present invention.

FIG. 10 is a schematic block diagram of another embodiment of the multi-cloud dispersed, or distributed, storage network (DSN) system 5 that continues the example of FIG. 9. After the data director module 84-1 executes the multi-cloud storage scheme 96 to store data object 40, the data director module 84-1 generates a data index 92 for data object 40 indicating where the encoded data slices (EDSs) are stored throughout the multi-cloud DSN system 5.

The data director module 84-1 sends an estimated response time 98 based on the response times of cloud storage systems 8-1 to 8-3 to the user computing device 6. User computing device 6 can dynamically adjust network time-outs based on this estimated response time. For example, if the estimated response time 98 is longer than the user computing device's time-out setting, the time-out is extended so that data access requests can be completed.

The data director module 84-1 monitors the performance information of the set of two or more cloud storage systems and data object usage information of the data object to determine a multi-cloud storage performance level. For example, the data director module 84-1 monitors performance information from cloud storage systems 8-1 through 8-3 by requesting updated cost information and receiving undated performance information as data access requests occur (e.g., response time changes, latency changes, network connectivity issues, etc.).

The data director module 84-1 determines data object usage information based on monitoring the metadata associated with data object 40 to determine how often the data object is accessed and/or whether certain storage locations are accessed more or less frequently than others.

As such, data director module 84-1 is shown obtaining performance information and data usage 1 from cloud storage system 8-1 pertaining to EDSs 1-1 to 1-10 and EDSs 2-1 to 2-10, performance information and data usage 2 from cloud storage system 8-2 pertaining to EDSs 3-1 to 3-10 and EDSs 4-1 to 4-10, and performance information and data usage 3 from cloud storage system 8-3 pertaining to EDSs 5-1 to 5-10.

When the multi-cloud storage performance level is below a threshold, the data director module 84-1 adjusts the multi-cloud storage scheme to produce an updated multi-cloud storage scheme based on the performance information of the available cloud storage systems and the data object usage information. The threshold may be set by one or more of the user computing device 6 and the data director module 84-1 and is set based on performance and usage minimums (e.g., a price point, usage minimum, network connectivity tolerance, lowest acceptable response time, etc.).

As an example, the performance information and data usage 1 from cloud storage system 8-1 indicates a significant cost increase and the performance information and data usage 3 from cloud storage system 8-3 indicates network connectivity issues that have persisted for a period of time. The data usage from cloud storage systems 8-1 to 8-3 indicates that data object 40 has not been accessed in a long period of time.

Figure 11:
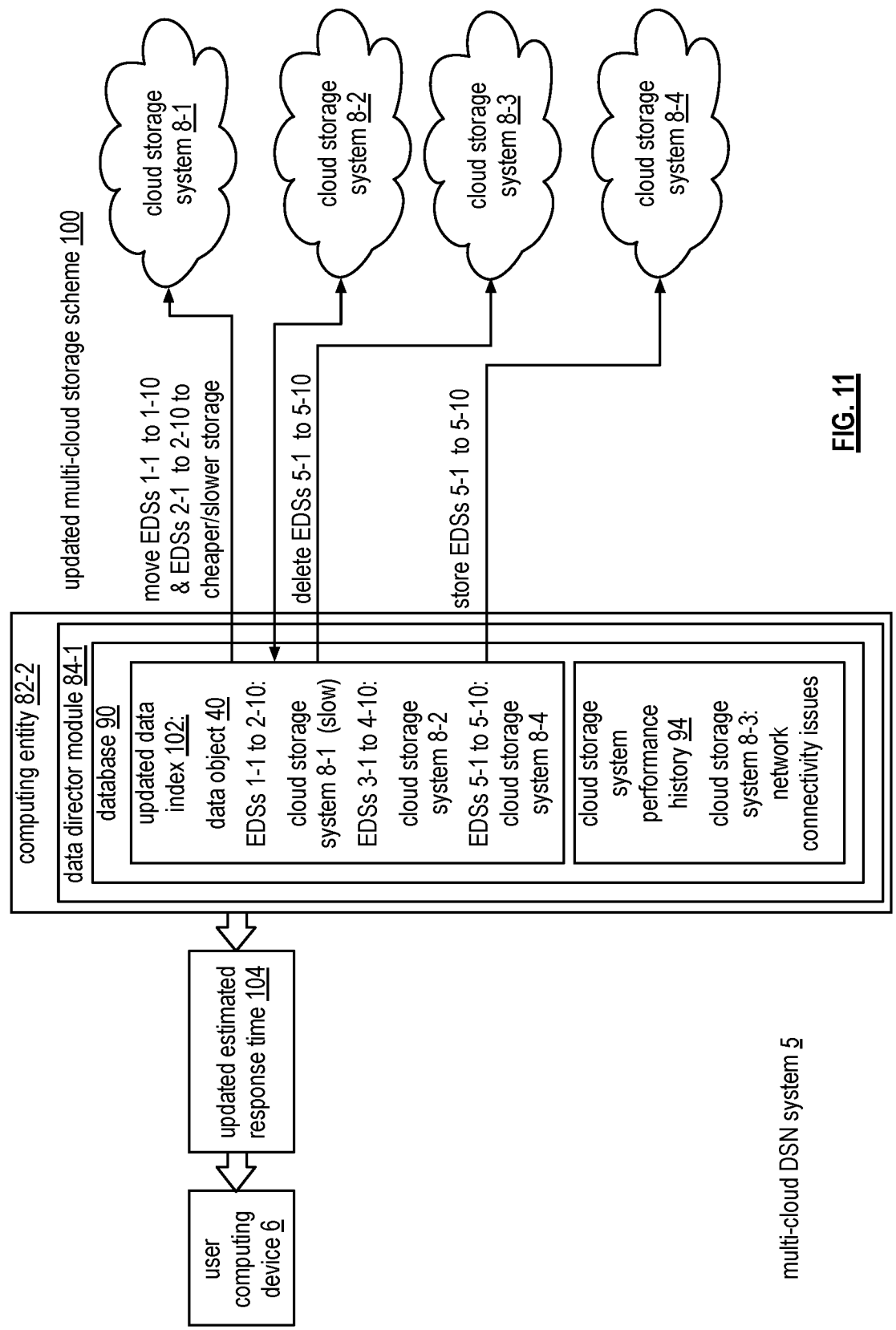
FIG. 11 is a schematic block diagram of another embodiment of the multi-cloud dispersed, or distributed, storage network (DSN) system in accordance with the present invention.

FIG. 11 is a schematic block diagram of another embodiment of the multi-cloud dispersed, or distributed, storage network (DSN) system 5 that continues the examples of FIGS. 9-10. Based on the performance information of cloud storage systems 8-1 through 8-3, the data object usage information, and performance information of other cloud storage systems of the multi-cloud DSN system 5, the data director module 84-1 adjusts the multi-cloud storage scheme to produce an updated multi-cloud storage scheme 100.

For example, because the data object 40 has not been accessed in a long period of time and cloud storage system 8-1 is more expensive, the data director module 84-1 decides to move EDSs 1-1 through 2-10 to a slower and therefore cheaper storage option within cloud storage system 8-1. For example, the data director module 84-1 moves EDSs 1-1 through 2-10 from "hot" or primary storage to archival storage or "cold" storage. If through further monitoring, the data director module 84-1 determines that the data is being accessed more regularly, the data can be moved back to a faster storage option or to a different cloud storage system with lower overall costs.

As another example, the updated multi-cloud storage scheme 100 also includes moving EDSs 5-1 through 5-10 to cloud storage system 8-4. Even though data is not being accessed regularly, the data director module 84-1 determines that the network connectivity issues experienced by cloud storage system 8-3 are too detrimental to keep the data stored there. Therefore, the data director module 84-1 determines an alternative cloud storage system 84-1 that fits storage parameters and meets performance requirements.

The data director module 84-1 updates the data index to produce an updated data index 102 indicating where the encoded data slices of data object 40 are now stored and sends an updated estimated response time 104 to user computing device 6. The data director module 84-1 also updates the cloud storage system performance information 94 to include the performance information received by cloud storage systems 8-1 to 8-3 (e.g., the network connectivity issues of cloud storage system 8-3, the cost increase of cloud storage systems 8-1, etc.).

Figure 12:
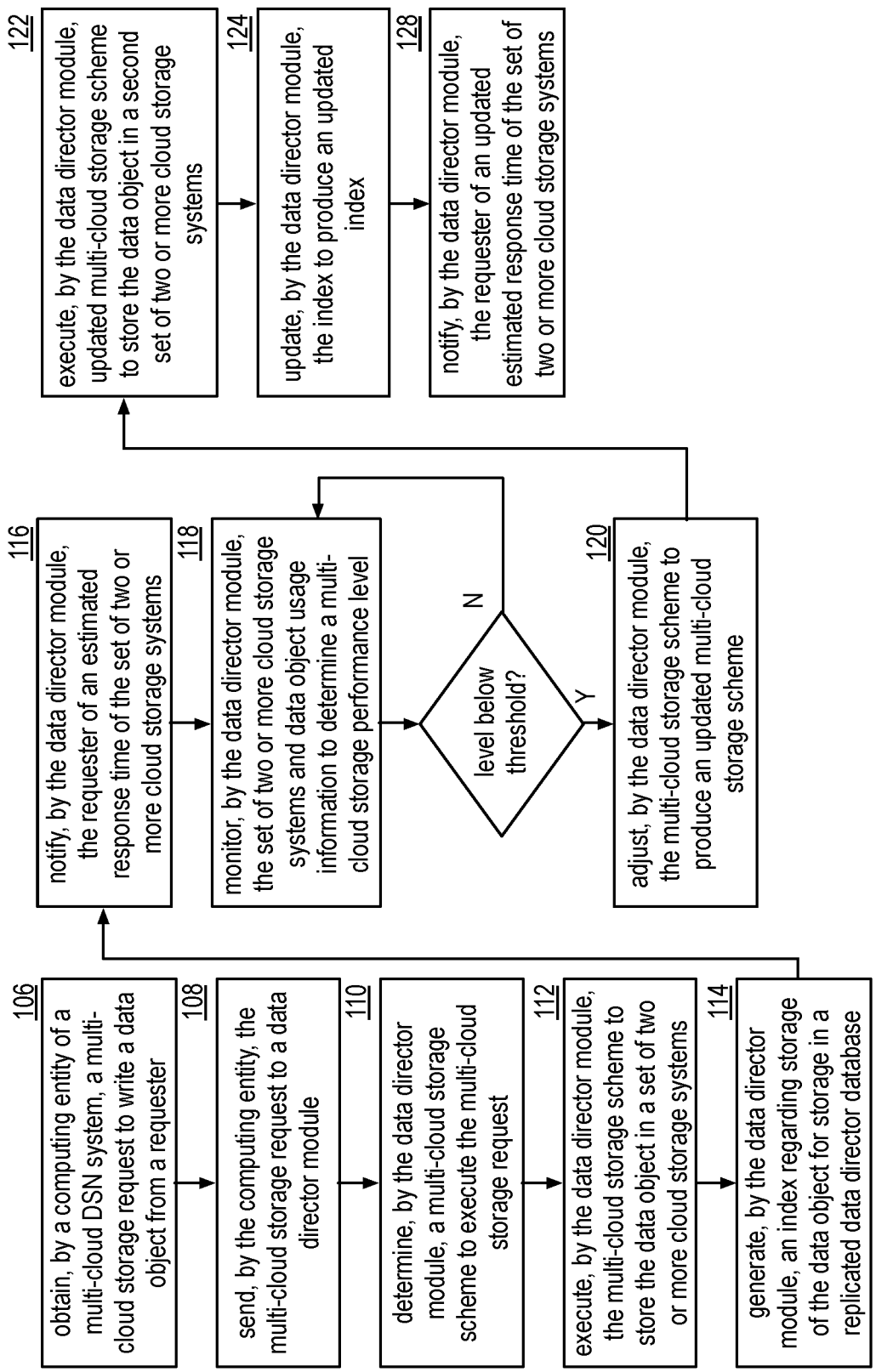
FIG. 12 is a logic diagram of an example of a method of data storage across a plurality of cloud storage systems in accordance with the present invention.

FIG. 12 is a logic diagram of an example of a method of data storage across a plurality of cloud storage systems. The method begins with step 106 where a computing entity of a plurality of computing entities of a multi-cloud dispersed storage network (DSN) system obtains a multi-cloud storage request from a requester of the multi-cloud DSN system.

The plurality of computing entities may be located in various geographical regions and serve as multi-cloud application programming interface (API) and data domain name systems (DNS). Typically, APIs to process data access requests are specific to a particular cloud storage system. Here, the plurality of computing entities use a single multi-cloud API to interface with the plurality of cloud storage systems.

The multi-cloud storage request is a request to write a data object to the multi-cloud DSN system, where the multi-cloud DSN system includes a plurality of cloud storage systems. The multi-cloud storage request includes a data object and a plurality of storage parameters. For example, the requester is a smart phone implementing an application to send the multi-cloud storage request "set( ).mydata.com" where mydata.com is a unique domain host name and the first portion contains the data object and the storage parameters used for the computing entity to call multiple cloud storage system APIs.

The storage parameters include one or more of the location of the multi-cloud storage request, a desired storage location (e.g., a particular geographic region), a storage reliability level (e.g., dispersed storage error encoding function parameters), a desired storage cost, a security level, an encoded data slice storage indication (e.g., a request to store the data object as a plurality of sets of encoded data slices), and a multiple data object storage indication (e.g., a request to store the data object as multiple copies).

The method continues with step 108 where the computing entity sends the multi-cloud storage request to a data director module of a plurality of data directors of the multi-cloud DSN system. The plurality of data director modules may be co-located in one or more of the plurality of computing entities, co-located in one or more of the plurality of cloud storage systems, and/or stand-alone devices. The computing entity selects the data director module based on one or more parameters of the multi-cloud storage request. For example, the computing entity selects the data director module based on one or more of: the location of the multi-cloud storage request and the desired storage location.

The data director module acts as a conduit and orchestrator to store data across two or more cloud storage systems of the multi-cloud DSN system. Storing data across multiple cloud storage systems prevents single points of connectivity failure and allows for a dynamically adjustable storage system that balances storage parameters, data usage, and the performance capabilities of the plurality of cloud storage systems.

The method continues with step 110 where the data director module determines a multi-cloud storage scheme to execute the multi-cloud storage request. The multi-cloud storage scheme is based on one or more of: the one or more parameters of the multi-cloud storage request, performance information of available cloud storage systems of the plurality of cloud storage systems, storage options of the available cloud storage systems, and proximity of the available cloud storage systems.

Performance information of the available cloud storage systems includes one or more of latency, response time, network connectivity information, and cost (e.g., cost to upload, download, move data, etc.). Storage options of the available cloud storage systems include data size requirements (e.g., cloud storage systems may have a data size limit and/or different price points for different data sizes), primary data object storage, file sharing, backup storage, archival storage, block storage, file storage, data warehouse, data lake, hybrid storage, disk storage, solid state drive (SSD) storage, and storage security features. Archive and backup storage (e.g., cold storage) generally costs less than primary block or object storage (e.g., hot storage). Some cloud storage systems offer the option of disk-based or flash (solid state drives (SSDs)) storage where flash would be a more expensive option. Storage security features include encryption techniques, ability to lock data, authentication techniques, etc. Depending on the nature of the data to be stored, enhanced storage security features may be desirable.

The data director module obtains the performance information of the available cloud storage systems in many ways. For example, the data director module requests cost information from the available cloud storage systems at certain time intervals (e.g., the data director module queries the available cloud storage systems for cost information daily, twice daily, bi weekly, etc.). As another example, the data director module stores a small test data object in the cloud storage systems that it wishes to monitor. The test data object is a small data file stored in a stale information area of a cloud storage system (e.g., an area where active work is not occurring). The data director module sends various data access requests for the test data object and analyzes the data access responses to determine performance information.

The data director module further obtains the performance information by obtaining cloud storage system performance history information from a replicated data director database shared by the plurality of data director modules (where performance information is added to the cloud storage system performance history after every data access request). The data director module may also obtain the performance information by analyzing metadata associated with stored data objects of data object buckets (e.g., a portion of a logical storage vault associated with a particular user).

The method continues with step 112 where the data director module executes the multi-cloud storage scheme to store the data object in a set of two or more cloud storage systems of the available cloud storage systems. For example, the data director module determines to store the data object as multiple copies (e.g., versus encoded data slices) and to store a primary data object in a cloud storage system with the fastest response time (e.g., based on the cloud storage system performance history and/or proximity to the requester) and backup versions of the data object in slower cloud storage systems.

As another example, the data director module selects the cheapest cloud storage systems and/or storage options within cloud storage systems when the storage parameters indicate a low price point. As another example, the data director module determines to store the data object as a plurality of sets of encoded data slices (EDSs) across a group of cloud storage systems. The storage parameters may indicate dispersed storage error encoding function parameters (e.g., segment number, the pillar width, decode threshold, etc.) and/or the data director module may have determined dispersed storage error encoding function parameters based on one or more of a desired reliability level, a desired security level, and a slice storage indication included in the storage parameters and/or the security and reliability storage options of the cloud storage systems.

The method continues with step 114 where the data director module generates an index regarding the storage of the data object in the set of two or more cloud storage systems for storage in the replicated data director database shared by the plurality of data director modules.

The method continues with step 116 where the data director module notifies the requester of an estimated response time of the set of two or more cloud storage systems. Based on the estimated response time the requester can dynamically adjust network time-outs. For example, if the estimated response time is longer than the requester's network time-out setting, the time-out is extended so that data access requests can be completed.

The method continues with step 118 where the data director module monitors the performance information of the set of two or more cloud storage systems and data object usage information of the data object to determine a multi-cloud storage performance level. For example, the data director module monitors performance information from the set of two or more cloud storage systems by requesting updated cost information and receiving undated performance information as data access requests occur (e.g., response time changes, latency changes, network connectivity issues, etc.).

The data director module determines data object usage information based on monitoring the metadata associated with the data object to determine how often the data object is accessed and/or whether certain storage locations are accessed more or less frequently than others.

When the multi-cloud storage performance level is not below a threshold, the method branches back to step 118 where the data director module continues to monitor the performance information of the set of two or more cloud storage systems and data object usage information of the data object and determine a multi-cloud storage performance level.

When the multi-cloud storage performance level is below a threshold, the method continues with step 120 where the data director module adjusts the multi-cloud storage scheme to produce an updated multi-cloud storage scheme based on the performance information of the available cloud storage systems and the data object usage information. The threshold may be set by one or more of the requester and the data director module and is set based on performance and usage minimums (e.g., a price point, usage minimum, network connectivity tolerance, lowest acceptable response time, etc.).

The method continues with step 122 where the data director module executes the updated multi-cloud storage scheme to store the data object in a second set of two or more cloud storage systems of the available cloud storage systems. The second set of two or more cloud storage systems may include some, all, or none of the cloud storage systems of the set of two or more cloud storage systems.

The method continues with step 124 where the data director module updates the index to produce an updated index regarding the storage of the data object in the second set of two or more cloud storage systems. The method continues with step 126 where the data director module notifies the requester of an updated estimated response time of the second set of two or more cloud storage systems. The data director module continues to monitor the performance information of the second set of two or more cloud storage systems and data object usage information of the data object to determine a multi-cloud storage performance level and continues to update the multi-cloud storage scheme when needed.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   obtaining, by a computing entity of a plurality of computing entities of a multi-cloud dispersed storage network (DSN) system, a multi-cloud storage request from a requester of the multi-cloud DSN system, wherein the multi-cloud storage request is a request to write a data object to the multi-cloud DSN system, and wherein the multi-cloud DSN system includes a plurality of cloud storage systems;
   sending, by the computing entity, the multi-cloud storage request to a data director module of a plurality of data director modules of the multi-cloud DSN system, wherein the computing entity selects the data director module based on one or more parameters of the multi-cloud storage request;
   determining, by the data director module, a multi-cloud storage scheme to execute the multi-cloud storage request, wherein the multi-cloud storage scheme is based on one or more of: the one or more parameters of the multi-cloud storage request, performance information of available cloud storage systems of the plurality of cloud storage systems, storage options of the available cloud storage systems, and proximity of the available cloud storage systems;
   executing, by the data director module, the multi-cloud storage scheme to store the data object in a set of two or more cloud storage systems of the available cloud storage systems;
   generating, by the data director module, an index regarding storage of the data object in the set of two or more cloud storage systems for storage in a replicated data director database shared by the plurality of data director modules;
   notifying, by the data director module, the requester of an estimated response time of the set of two or more cloud storage systems;
   monitoring, by the data director module, the performance information of the set of two or more cloud storage systems and data object usage information of the data object to determine a multi-cloud storage performance level; and
   when the multi-cloud storage performance level is below a threshold:
      adjusting, by the data director module, the multi-cloud storage scheme to produce an updated multi-cloud storage scheme, wherein the updated multi-cloud storage scheme is based on the performance information of the available cloud storage systems and the data object usage information of the data object;
      executing, by the data director module, the updated multi-cloud storage scheme to store the data object in a second set of two or more cloud storage systems of the available cloud storage systems; and
      updating, by the data director module, the index to produce an updated index regarding the storage of the data object in the second set of two or more cloud storage systems; and notifying, by the data director module, the requester of an updated estimated response time of the second set of two or more cloud storage systems.

2. The method of claim 1, wherein the computing entity includes the data director module.

3. The method of claim 1, wherein the data director module is located in a cloud storage system of the plurality of cloud storage systems.

4. The method of claim 1, wherein the one or more parameters of the multi-cloud storage request include one or more of:
   a location of the multi-cloud storage request;
   a desired storage location;
   a storage reliability level;
   a desired storage cost;
   a security level;
   an encoded data slice storage indication; and
   a multiple data object storage indication.

5. The method of claim 4, wherein the computing entity selects the data director module based on one or more of: the location of the multi-cloud storage request and the desired storage location.

6. The method of claim 1, wherein the performance information includes one or more of:

latency;
response time;
network connectivity; and
cost.

7. The method of claim 1, wherein the storage options of the available cloud storage systems include one or more of:
data size requirements;
primary data object storage;
file sharing;
backup storage;
archival storage;
disk storage;
solid state drive (SSD) storage; and
storage security features.

8. The method of claim 1 further comprises:
obtaining, by the data director module, the performance information of the available cloud storage systems by one or more of:
requesting, by the data director module, cost information from the available cloud storage systems;
sending, by the data director module, a data access request for a test data object to one or more cloud storage systems of the available cloud storage systems to analyze a data access response from the one or more cloud storage systems, wherein the test data object is stored in the one or more cloud storage systems by the data director module for monitoring purposes;
obtaining, by the data director module, cloud storage system performance history information from the replicated data director database, wherein the cloud storage system performance history information includes performance information associated with storage of data objects stored throughout the multi-cloud DSN system; and
analyzing, by the data director module, metadata associated with the data objects stored throughout the multi-cloud DSN system.

9. A non-transitory computer readable memory comprises:
a first memory element that stores operational instructions that, when executed by a computing entity of a plurality of computing entities of a multi-cloud dispersed storage network (DSN) system, causes the computing entity to:
obtain a multi-cloud storage request from a requester of the multi-cloud DSN system, wherein the multi-cloud storage request is a request to write a data object to the multi-cloud DSN system, and wherein the multi-cloud DSN system includes a plurality of cloud storage systems; and
send the multi-cloud storage request to a data director module of a plurality of data director modules of the multi-cloud DSN system, wherein the computing entity selects the data director module based on one or more parameters of the multi-cloud storage request; and
a second memory element that stores operational instructions that, when executed by the data director module, causes the data director module to:
determine a multi-cloud storage scheme to execute the multi-cloud storage request, wherein the multi-cloud storage scheme is based on one or more of: the one or more parameters of the multi-cloud storage request, performance information of available cloud storage systems of the plurality of cloud storage systems, storage options of the available cloud storage systems, and proximity of the available cloud storage systems;
execute the multi-cloud storage scheme to store the data object in a set of two or more cloud storage systems of the available cloud storage systems;
generate an index regarding storage of the data object in the set of two or more cloud storage systems for storage in a replicated data director database shared by the plurality of data director modules;
notify the requester of an estimated response time of the set of two or more cloud storage systems;
monitor the performance information of the set of two or more cloud storage systems and data object usage information of the data object to determine a multi-cloud storage performance level; and
when the multi-cloud storage performance level is below a threshold:
adjust the multi-cloud storage scheme to produce an updated multi-cloud storage scheme, wherein the updated multi-cloud storage scheme is based on the performance information of the available cloud storage systems and the data object usage information of the data object;
execute the updated multi-cloud storage scheme to store the data object in a second set of two or more cloud storage systems of the available cloud storage systems;
update the index to produce an updated index regarding the storage of the data object in the second set of two or more cloud storage systems; and
notify the requester of an updated estimated response time of the second set of two or more cloud storage systems.

10. The computer readable memory of claim 9, wherein the computing entity includes the data director module.

11. The computer readable memory of claim 9, wherein the data director module is located in a cloud storage system of the plurality of cloud storage systems.

12. The computer readable memory of claim 9, wherein the one or more parameters of the multi-cloud storage request include one or more of:
a location of the multi-cloud storage request;
a desired storage location;
a storage reliability level;
a desired storage cost;
a security level;
an encoded data slice storage indication; and
a multiple data object storage indication.

13. The computer readable memory of claim 12, wherein the first memory element further stores operational instructions that, when executed by the computing entity, causes the computing entity to select the data director module based on one or more of: the location of the multi-cloud storage request and the desired storage location.

14. The computer readable memory of claim 9, wherein the performance information includes one or more of:
latency;
response time;
network connectivity; and
cost.

15. The computer readable memory of claim 9, wherein the storage options of the available cloud storage systems include one or more of:
data size requirements;
primary data object storage;
file sharing;

backup storage;
archival storage;
disk storage;
solid state drive (SSD) storage; and
storage security features.

16. The computer readable memory of claim 9, wherein the second memory element further stores operational instructions that, when executed by the data director module, causes the data director module to:
   obtain the performance information of the available cloud storage systems by one or more of:
      requesting cost information from the available cloud storage systems;
      sending a data access request for a test data object to one or more cloud storage systems of the available cloud storage systems to analyze a data access response from the one or more cloud storage systems, wherein the test data object is stored in the one or more cloud storage systems by the data director module for monitoring purposes;
      obtaining cloud storage system performance history information from the replicated data director database, wherein the cloud storage system performance history information includes performance information associated with storage of data objects stored throughout the multi-cloud DSN system; and
      analyzing metadata associated with the data objects stored throughout the multi-cloud DSN system.

* * * * *